United States Patent
Kim et al.

(10) Patent No.: US 10,482,627 B2
(45) Date of Patent: Nov. 19, 2019

(54) METHOD AND ELECTRONIC DEVICE FOR CALIBRATION OF STEREO CAMERA

(71) Applicant: Samsung Electronics Co., Ltd., Gyeonggi-do (KR)

(72) Inventors: Gi Yeong Kim, Gyeonggi-do (KR); Kyoung Young Kim, Gyeonggi-do (KR); Young Chan Jeon, Gyeonggi-do (KR); Jeong Won Lee, Gyeonggi-do (KR); Hee Chul Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/712,832

(22) Filed: Sep. 22, 2017

(65) Prior Publication Data
US 2018/0082441 A1 Mar. 22, 2018

(30) Foreign Application Priority Data
Sep. 22, 2016 (KR) .................. 10-2016-0121274

(51) Int. Cl.
*H04N 13/239* (2018.01)
*G06T 7/80* (2017.01)
(Continued)

(52) U.S. Cl.
CPC ............ *G06T 7/85* (2017.01); *H04N 5/23287* (2013.01); *H04N 13/239* (2018.05); *H04N 13/246* (2018.05); *G06T 2207/10012* (2013.01)

(58) Field of Classification Search
USPC ......................................................... 348/47
See application file for complete search history.

(56) References Cited

U.S. PATENT DOCUMENTS 6,304,284 B1 * 10/2001 Dunton .................. G06T 3/4038
348/36
6,733,462 B1 5/2004 Frick et al.
(Continued)

FOREIGN PATENT DOCUMENTS

EP 1 101 441 5/2001
JP 2011-048295 3/2011
(Continued)

OTHER PUBLICATIONS

International Search Report dated Dec. 8, 2017 issued in counterpart application No. PCT/KR2017/009051, 13 pages.
(Continued)

*Primary Examiner* — Behrooz M Senfi
(74) *Attorney, Agent, or Firm* — The Farrell Law Firm, P.C.

(57) ABSTRACT

An electronic device includes a first camera that obtains a first image, a second camera that obtains a second image having a disparity with the first image, a memory that stores a first calibration parameter, and a processor that calibrates at least one of the first image and the second image by using the first calibration parameter and composes the first image and the second image. The processor is configured to collect, if a specified event occurs, images obtained from the first camera and the second camera after the specified event occurs and store the collected images in the memory, to compute a second to calibration parameter based on the images obtained after the specified event occurs, if a specified condition is satisfied, and to update the first calibration parameter with the second calibration parameter.

20 Claims, 9 Drawing Sheets

(51) Int. Cl.
*H04N 13/246* (2018.01)
*H04N 5/232* (2006.01)

(56) References Cited

U.S. PATENT DOCUMENTS

| | | | |
|---|---|---|---|
| 8,315,613 | B1 | 11/2012 | Rahman et al. |
| 8,890,934 | B2 | 11/2014 | Li et al. |
| 9,384,551 | B2 | 7/2016 | Ramaswamy et al. |
| 2006/0227221 | A1 | 10/2006 | Okubo |
| 2011/0069156 | A1 | 3/2011 | Kurahashi |
| 2012/0147139 | A1* | 6/2012 | Li .................... G03B 35/08 348/43 |
| 2013/0107011 | A1 | 5/2013 | Kim et al. |
| 2014/0300704 | A1* | 10/2014 | Ramaswamy ............ G06T 7/85 348/48 |
| 2015/0043886 | A1* | 2/2015 | Bang .................... H04N 7/188 386/223 |
| 2015/0049172 | A1 | 2/2015 | Ramachandra et al. |
| 2015/0195434 | A1 | 7/2015 | Kwon et al. |
| 2016/0150402 | A1* | 5/2016 | Daly .................... H04W 12/06 455/411 |
| 2016/0173869 | A1 | 6/2016 | Wang et al. |
| 2016/0178707 | A1 | 6/2016 | Young et al. |
| 2016/0180510 | A1 | 6/2016 | Grau |
| 2016/0198145 | A1 | 7/2016 | Lee |
| 2018/0056996 | A1* | 3/2018 | Lee .................... B60T 8/17557 |
| 2018/0225838 | A1* | 8/2018 | Ohara .................... G06T 7/593 |
| 2019/0158813 | A1* | 5/2019 | Rowell ................ H04N 13/246 |

FOREIGN PATENT DOCUMENTS

| | | |
|---|---|---|
| KR | 1020130046857 | 5/2013 |
| KR | 1020130080508 | 7/2013 |
| KR | 1020140054797 | 5/2014 |
| KR | 1020160043995 | 4/2016 |
| WO | WO 92/13288 | 8/1992 |

OTHER PUBLICATIONS

European Search Report dated May 10, 2019 issued in counterpart application No. 17853303.0-1209, 10 pages.
European Search Report dated Aug. 23, 2019 issued in counterpart application No. 17853303.0-1209, 23 pages.

* cited by examiner

METHOD AND ELECTRONIC DEVICE FOR CALIBRATION OF STEREO CAMERA

PRIORITY

This application claims priority under 35 U.S.C. § 119(a) to Korean Application Serial No. 10-2016-0121274, which was filed in the Korean Intellectual Property Office on Sep. 22, 2016, the entire content of which is incorporated herein by reference.

BACKGROUND

1. Field of the Disclosure

The present disclosure relates to a method for calibrating a stereo camera and an electronic device performing the same.

2. Description of the Related Art

As information technologies are being developed, a camera has evolved from a traditional film camera into a digital camera. Nowadays, there is being developed a stereo camera that is able to detect a three-dimensional distance or depth.

The stereo camera may include a plurality of camera modules and may compose image data photographed by the camera modules. A user may perceive depth from the composed image.

Since the stereo camera photographs a single subject by using a plurality of camera modules, calibration between two cameras should be very important. A calibration parameter which is data for the calibration is set in advance during the manufacturing process. For this reason, if lenses or image sensors are distorted due to external physical shock, a sharp change in an external temperature, or age deterioration, there may be difficulty in composing images normally.

SUMMARY

Aspects of the present disclosure are to address at least the above-mentioned problems and/or disadvantages and to provide at least the advantages described below.

Accordingly, an aspect of the present disclosure is to provide a calibration method for calculating and updating an appropriate calibration parameter based on image data previously accumulated under a specified condition in the case where distortion of a lens or an image sensor occurs due to a specific event or in the case where the probability that distortion of a lens or an image sensor occurs due to a specific event exists, a calibration method using the updated calibration parameter, and an electronic device performing the same.

In accordance with an aspect of the present disclosure, an electronic device may include a first camera that obtains a first image, a second camera that obtains a second image having a disparity with the first image, a memory that stores a first calibration parameter, and a processor that calibrates at least one of the first images and the second image by using the first calibration parameter and composes the first image and the second image. The processor may be configured to collect, if a specified event occurs, images obtained from the first camera and the second camera after the specified event occurs and store the collected images in the memory, to compute a second calibration parameter based on the images obtained after the specified event occurs, if a specified condition is satisfied, and to update the first calibration parameter with the second calibration parameter.

In accordance with another aspect of the present disclosure, a calibration method may include obtaining a first image and a second image having a disparity with the first image, calibrating at least one of the first images and the second image by using a first calibration parameter and composing the first image and the second image, collecting, if a specified event occurs, images obtained from a first camera and a second camera after the specified event occurs and storing the collected images in a memory, computing a second calibration parameter based on the images obtained after the specified event occurs, if a specified condition is satisfied, and updating the first calibration parameter with the second calibration parameter.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
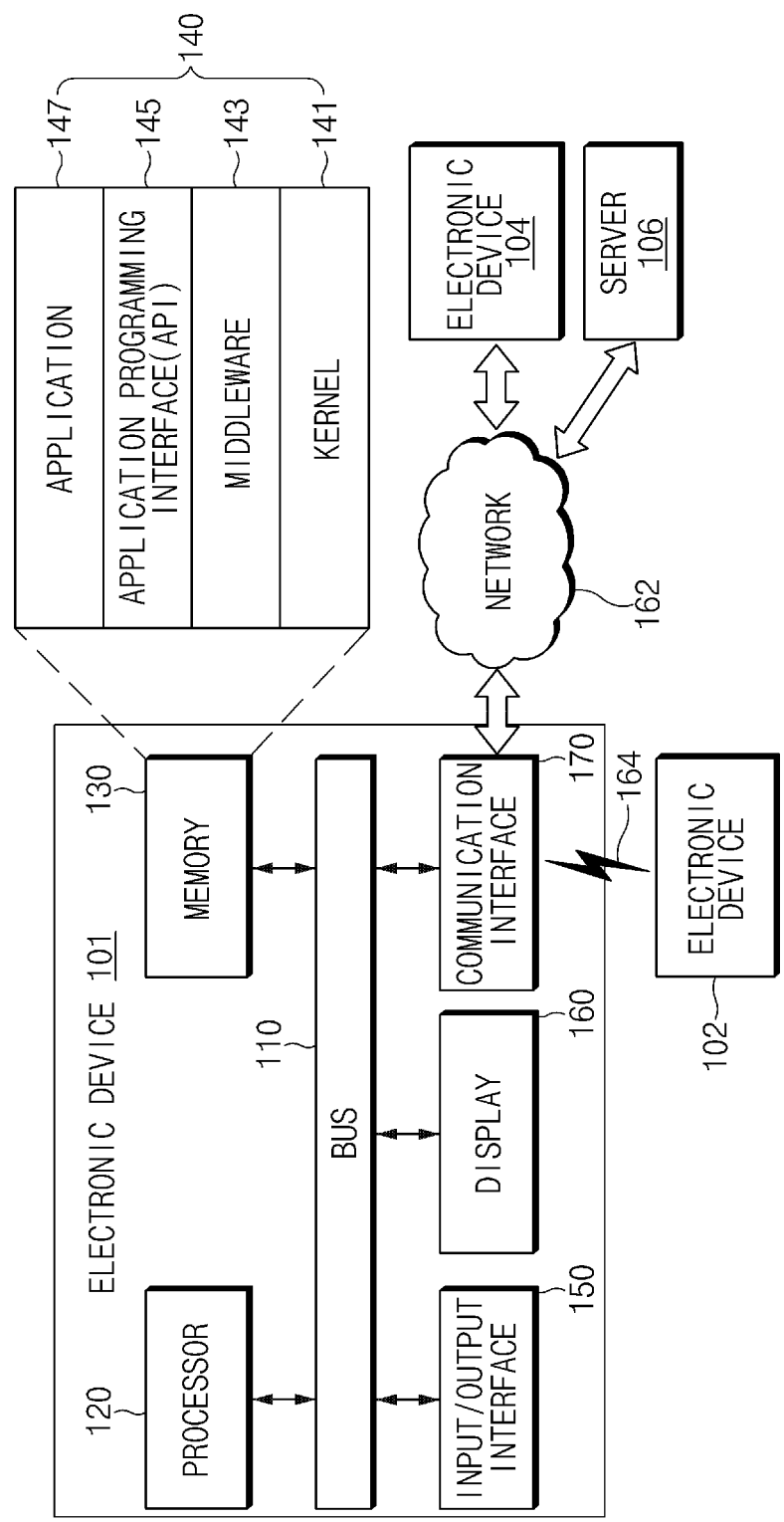
FIG. 1 illustrates an electronic device according to various embodiments of the present disclosure.

Hereinafter, various embodiments of the present disclosure will be described with reference to accompanying drawings. Accordingly, those skilled in the art will recognize that modifications, equivalents, and/or alternatives on the various embodiments described herein can be variously made without departing from the scope and spirit of the present disclosure. The same or similar reference denotations may be used to refer to the same or similar elements throughout the specification and the drawings.

In this disclosure, the expressions "have", "may have", "include" and "comprise", or "may include" and "may comprise" indicate existence of corresponding features (e.g., to elements such as numeric values, functions, operations, or components) but do not exclude the presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing from the scope of this disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used interchangeably with, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specific embodiments and are not intended to limit the scope of another embodiment. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as is customary in the relevant art and not in an idealized or overly formal unless expressly so defined in various embodiments of this disclosure. In some cases, even if certain terms are defined in this disclosure, they may not be interpreted to exclude embodiments of this disclosure.

An electronic device according to various embodiments of this disclosure may include smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like.

According to another embodiment, an electronic device may include various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above described devices or a combination thereof. An electronic device may be a flexible electronic device. Furthermore, an electronic device is not limited to the above described electronic devices and may include other electronic devices and new electronic devices according to developing technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates a block diagram of an electronic device according to various embodiments.

Referring to FIG. 1, according to various embodiments, an electronic device 101, 102, 104, or a server 106 may be connected with each other over a network 162 or local is wireless communication 164. The electronic device 101 may include a bus 110, a processor 120, a memory 130, an input/output interface 150, a display 160, and a communication interface 170. According to an embodiment, the electronic device 101 may not include at least one of the above described elements or may further include other element(s).

The bus 110 may interconnect the above described elements 110 to 170 and may include a circuit for conveying communications (e.g., a control message and/or data) among the above described elements.

The processor 120 may include one or more of a central processing unit (CPU), an application processor (AP), or a communication processor (CP). The processor 120 may perform an arithmetic operation or data processing associated with control and/or communication of at least one other element(s) of the electronic device 101.

The memory 130 may include a volatile and/or nonvolatile memory. The memory 130 may store instructions or data associated with other element(s) of the electronic device 101. According to an embodiment, the memory 130 may store software and/or a program 140. The program 140 may include, for example, a kernel 141, a middleware 143, an application programming interface (API) 145, and/or an application program (or "an application") 147. At least a part of the kernel 141, the middleware 143, or the API 145 may be referred to as an "operating system (OS)".

The kernel 141 may control or manage system resources (e.g., the bus 110, the processor 120, the memory 130, and the like) that are used to execute operations or functions of other programs (e.g., the middleware 143, the API 145, and the application 147). Furthermore, the kernel 141 may provide an interface that allows the middleware 143, the API 145, or the application 147 to access discrete elements of the electronic device 101 to control or manage system resources.

The middleware 143 may perform, for example, a mediation role such that the API 145 or the application 147 communicates with the kernel 141 to exchange data.

Furthermore, the middleware 143 may process one or more task requests received from the application 147 according to a priority. For example, the middleware 143 may assign the priority, which makes it possible to use a system resource (e.g., the bus 110, the processor 120, the memory 130, or the like) of the electronic device 101, to at least one of the applications 147. The middleware 143 may process one or more task requests according to the assigned priority which makes it possible to perform scheduling or load balancing on the one or more task requests.

The API 145 may be, for example, an interface through which the application 147 controls a function provided by the kernel 141 or the middleware 143, and may include, for example, at least one interface or function (e.g., an instruction) for a file control, a window control, image processing, a character control, or the like.

The input/output interface 150 may play a role, for example, of an interface which transmits an instruction or data input from a user or another external device, to other element(s) of the electronic device 101. Furthermore, the input/output interface 150 may output an instruction or data, received from other element(s) of the electronic device 101, to a user, or another external device.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a part of a user's body.

The communication interface 170 may establish communication between the electronic device 101 and an external device (e.g., the first external electronic device 102, the second external electronic device 104, or the server 106). For example, the communication interface 170 may be connected to the network 162 over wireless communication or wired communication to communicate with the external device (e.g., the second external electronic device 104 or the server 106).

The wireless communication may include cellular communication employing long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, as cellular communication protocol. According to an embodiment, the wireless communication may include, for example, at least one of wireless fidelity (Wi-Fi), Bluetooth®, Bluetooth low energy (BLE), Zigbee, near field communication (NFC), magnetic stripe transmission (MST), radio frequency (RF), a body area network (BAN), and a global navigation satellite system (GNSS).

The MST may generate a pulse in response to transmission data using an electromagnetic signal, and the pulse may generate a magnetic field signal. The electronic device 101 may transfer the magnetic field signal to a POS and the POS may detect the magnetic field signal using an MST reader. The POS may recover the data by converting the detected magnetic field signal to an electrical signal.

The GNSS may include a global positioning system (GPS), a global navigation satellite system (Glonass), a Beidou navigation satellite system (Beidou), or a European global satellite-based navigation system (Galileo) based on an available region, a bandwidth, or the like. Hereinafter, in this disclosure, "GPS" and "GNSS" may be interchangeably used. The wired communication may include a universal serial bus (USB), a high definition multimedia interface (HDMI), a recommended standard-232 (RS-232), a plain old telephone service (POTS), and the like. The network 162 may include at least one of telecommunications networks, for example, a computer network (e.g., LAN or WAN), an Internet, or a telephone network.

Each of the first and second external electronic devices 102 and 104 may be a device of which the type is different from or the same as that of the electronic device 101. The server 106 may include a group of one or more servers. According to various embodiments, all or a portion of operations performed in the electronic device 101 may be executed by another or a plurality of electronic devices (e.g., the electronic devices 102 and 104, or the server 106). In the case where the electronic device 101 executes any function or service automatically or in response to a request, the electronic device 101 may not perform the function or the service internally, but may request at least a portion of a function associated with the electronic device 101 from other device(s) (e.g., the electronic device 102 or 104, or the server 106). The other electronic device (e.g., the electronic device 102 or 104, or the server 106) may execute the requested function or additional function and may transmit the execution result to the electronic device 101. The electronic device 101 may provide the requested function or service using the received result or may additionally process the received result to provide the requested function or service. Cloud computing, distributed computing, or client-server computing may be used.

Figure 2:
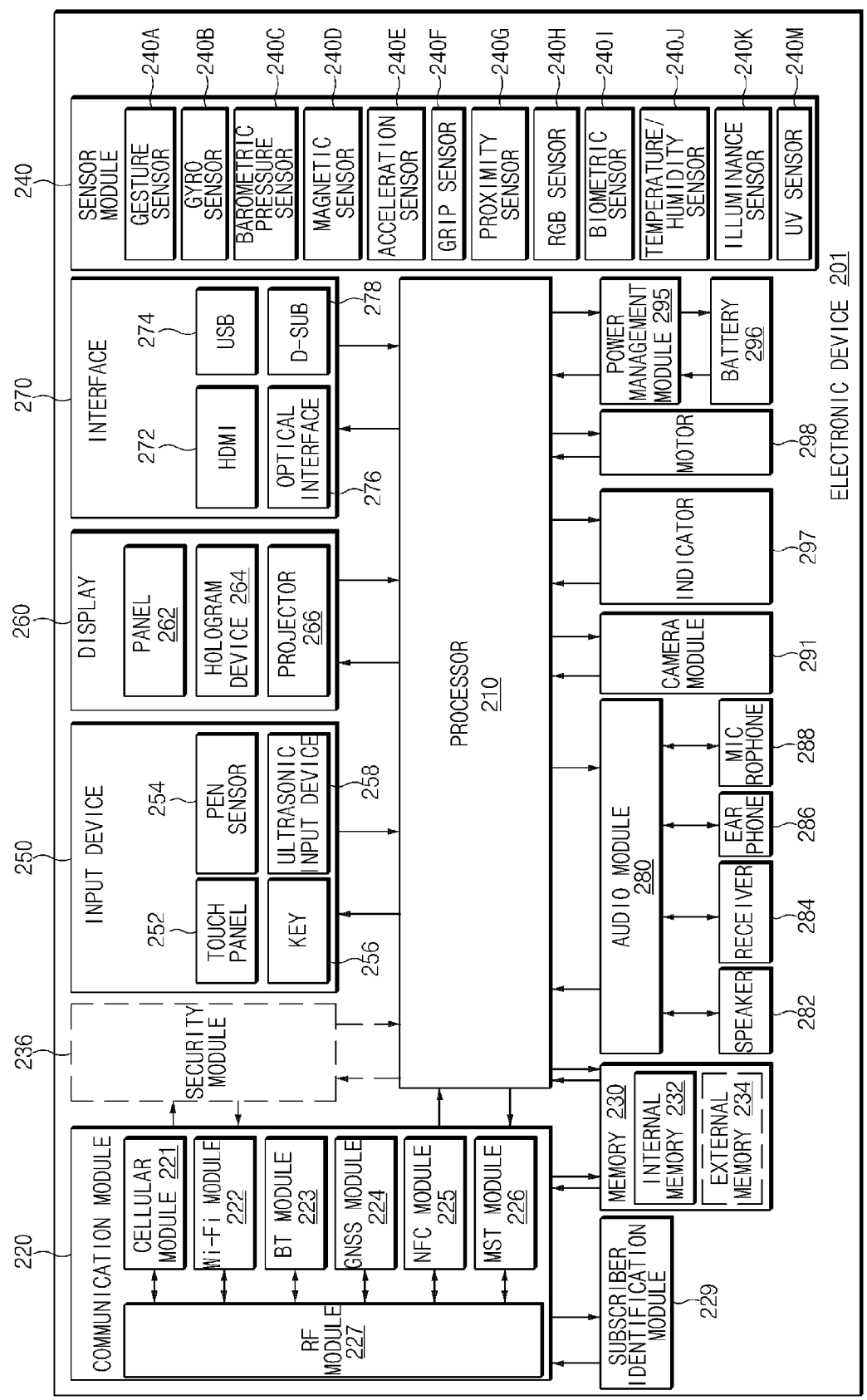
FIG. 2 illustrates a block diagram of the electronic device according to various embodiments of the present disclosure.

FIG. 2 illustrates a block diagram of an electronic device, according to various embodiments.

Referring to FIG. 2, an electronic device 201 may include, for example, the entire part or a part of the electronic device 101 illustrated in FIG. 1. The electronic device 201 may include one or more processors (e.g., an application processor (AP)) 210, a communication module 220, a subscriber identification module 229, a memory 230, a sensor module 240, an input device 250, a display 260, an interface 270, an audio module 280, a camera 291, a power management module 295, a battery 296, an indicator 297, and a motor 298.

The processor 210 may operate, for example, an operating system (OS) or an application to control a plurality of hardware or software elements connected to the processor 210 and may process and compute a variety of data. The processor 210 may be to implemented with a System on Chip (SoC). According to an embodiment, the processor 210 may further include a graphic processing unit (GPU) and/or an image signal processor. The processor 210 may include at least a part (e.g., a cellular module 221) of elements illustrated in FIG. 2. The processor 210 may load an instruction or data, which is received from at least one of other elements (e.g., a nonvolatile memory), into a volatile memory and process the loaded instruction or data. The processor 210 may store a variety of data in the nonvolatile memory.

The communication module 220 may be configured the same as or similar to the communication interface 170 of FIG. 1. The communication module 220 may include the cellular module 221, a Wi-Fi module 222, a Bluetooth (BT) module 223, a GNSS module 224 (e.g., a GPS module, a Glonass module, a Beidou module, or a Galileo module), a near field communication (NFC) module 225, an MST module 226, and a radio frequency (RF) module 227.

The cellular module 221 may provide, voice communication, video communication, a character service, an Internet service, and the like over a communication network. According to an embodiment, the cellular module 221 may perform discrimination and authentication of the electronic device 201 within a communication network by using the subscriber identification module (SIM) 229. According to an embodiment, the cellular module 221 may perform at least a portion of functions that the processor 210 provides. According to an embodiment, the cellular module 221 may include a communication processor (CP).

Each of the Wi-Fi module 222, the BT module 223, the GNSS module 224, the NFC module 225, or the MST module 226 may include a processor for processing data exchanged through a corresponding module, for example. According to an embodiment, at least a part (e.g., two or more) of the cellular module 221, the Wi-Fi module 222, the BT module 223, the GNSS module 224, the NFC module 225, or the MST module 226 may be included within one Integrated Circuit (IC) or an IC package.

The RF module 227 may transmit and receive a communication signal (e.g., an RF to signal). The RF module 227 may include a transceiver, a power amplifier module (PAM), a frequency filter, a low noise amplifier (LNA), an antenna, and the like. According to another embodiment, at least one of the cellular module 221, the Wi-Fi module 222, the BT module 223, the GNSS module 224, the NFC module 225, or the MST module 226 may transmit and receive an RF signal through a separate RF module.

The SIM 229 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 230 may include an internal memory 232 or an external memory 234. The internal memory 232 may include a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be operatively and/or physically connected to the electronic device 201 through various interfaces.

A security module 236 may be a module that includes a storage space of which a security level is higher than that of the memory 230 and may be a circuit that guarantees safe data storage and a protected execution environment. The security module 236 may be implemented with a separate circuit and may include a separate processor. The security module 236 may be in a smart chip or a secure digital (SD) card, which is removable, or may include an embedded secure element (eSE) embedded in a fixed chip of the electronic device 201. Furthermore, the security module 236 may operate based on an OS that is different from the OS of the electronic device 201. The security module 236 may operate based on java card open platform (JCOP) OS.

The sensor module 240 may measure a physical quantity or may detect an operation state of the electronic device 201. The sensor module 240 may convert the measured or detected information to an electric signal. The sensor module 240 may include at least one of a gesture sensor 240A, a gyro sensor 240B, a barometric pressure sensor 240C, a magnetic sensor 240D, an acceleration sensor 240E, a grip sensor 240F, the proximity sensor 240G, a color sensor 240H (e.g., red, green, blue (RGB) sensor), a biometric sensor 240I, a temperature/humidity sensor 240J, an illuminance sensor 240K, and an UV sensor 240M. Although not illustrated, additionally or generally, the sensor module 240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to an embodiment, the electronic device 201 may further include a processor that is a part of the processor 210 or independent of the processor 210 and is configured to control the sensor module 240. The processor may control the sensor module 240 while the processor 210 remains at a sleep state.

The input device 250 may include, a touch panel 252, a (digital) pen sensor 254, a key 256, and an ultrasonic input unit 258. The touch panel 252 may use capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, or a keypad. The ultrasonic input device 258 may detect (or sense) an ultrasonic signal, which is generated from an input device, through a microphone 288 and may check data corresponding to the detected ultrasonic signal.

The display 260 may include a panel 262, a hologram device 264, and a projector 266. The panel 262 may be the same as or similar to the display 160 illustrated in FIG. 1. The panel 262 may be implemented, for example, to be flexible, transparent or wearable. The panel 262 and the touch panel 252 may be integrated into a single module. The hologram device 264 may display a stereoscopic image in a space using a light interference phenomenon. The projector 266 may project light onto a screen so as to display an image. The screen may be arranged in the inside or the outside of the electronic device 201. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. According to an embodiment, the display 260 may further include a control circuit for controlling the panel 262, the hologram device 264, and the projector 266.

The interface 270 may include a high-definition multimedia interface (HDMI) 272, a universal serial bus (USB) 274, an optical interface 276, or a D-subminiature (D-sub) 278. The interface 270 may be included in the communication interface 170 illustrated in FIG. 1. Additionally, the interface 270 may include a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included in the input/output interface 150 illustrated in FIG. 1. The audio module 280 may process sound information that is input or output through a speaker 282, a receiver 284, an earphone 286, or the microphone 288.

The camera 291 may shoot a still image or a video. According to an embodiment, the camera module 291 may include one or more image sensors (e.g., a front sensor or a rear sensor), a lens, an image signal processor (ISP), or a flash (e.g., an LED or a xenon lamp).

The power management module 295 may manage the power of the electronic device 201. According to an embodiment, a power management integrated circuit (PMIC), a charger IC, or a battery gauge may be included in the power management module 295. The PMIC may have a wired charging method and/or a wireless charging method. The wireless charging method may include a magnetic resonance method, a magnetic induction method, or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include a rechargeable battery and/or a solar battery.

The indicator 297 may display a specified state of the electronic device 201 or a part thereof (e.g., the processor 210), such as a booting state, a message state, a charging state, and the like. The motor 298 may convert an electrical signal into a mechanical vibration and may generate vibration, haptic, and the like. Although not illustrated, a processing device (e.g., a GPU) for supporting a mobile TV may be included in the electronic device 201. The processing device for supporting the mobile TV may process media data according to the standards of digital multimedia broadcasting (DMB), digital video broadcasting (DVB), MediaFLO™, or the like.

Each of the above-mentioned elements of the electronic device according to various embodiments described in this disclosure may be configured with one or more components, and the names of the elements may be changed according to the type of the electronic device. The electronic device may one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3A:
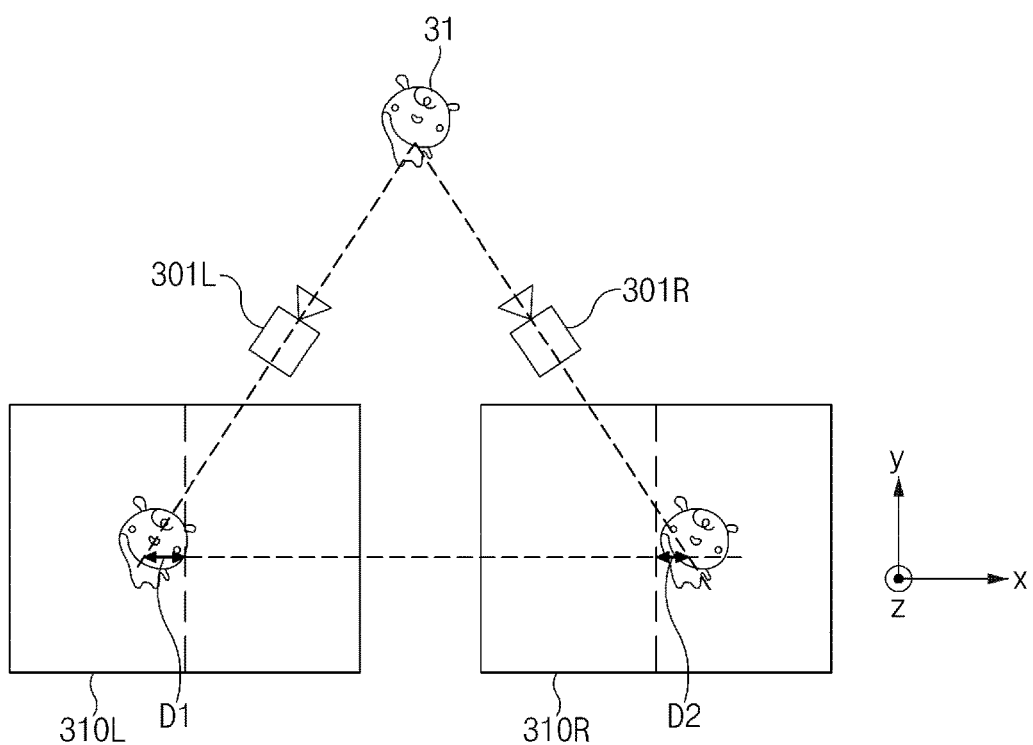
FIGS. 3A and 3B are views for describing calibration of a stereo camera.
Figure 3B:
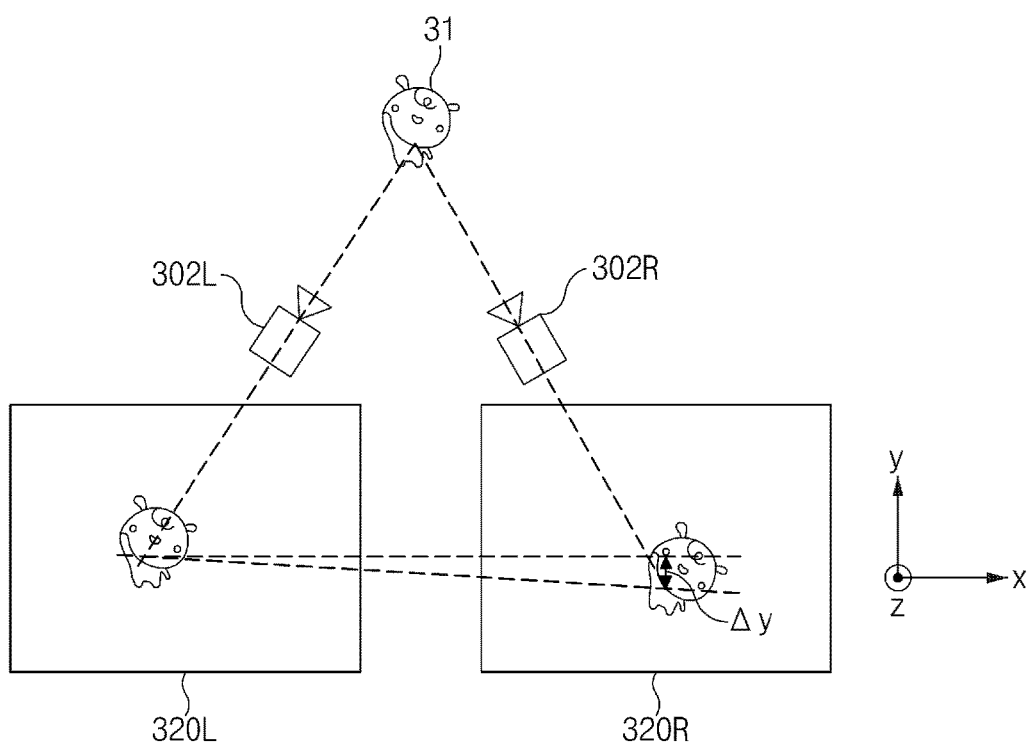

FIGS. 3A and 3B are views for describing calibration of a stereo camera.

Referring to FIG. 3A, the stereo camera according to an embodiment may include a first camera 301L that is disposed at the left to face an subject 31 and a second camera 301R that is disposed at the right to face the subject 31.

The first camera 301L may receive light reflected from the subject 31 in response to an operation of a shutter. The light may cause photoelectric conversion in an image sensor included in the first camera 301L. The light may be converted into an electrical signal by the photoelectric conversion, and digital data from a first image 310L may be created by performing analog to digital conversion on the electrical signal. The second camera 301R may receive light reflected from the subject 31 to create a second image 310R.

According to an embodiment, the first image 310L may have a specified disparity with the second image 310R. For example, in the first image 310L, a subject 31L may be disposed at the left by "D1" in the x-axis direction with respect to the center of an x-axis direction of the first image 310L. Also, for example, in the second image 310R, a subject 31R may be disposed at the right by "D2" in the x-axis direction with respect to the center of the x-axis direction of the second image 310R. In this case, the first image 310L and the second image 310R may have a disparity of "D1+D2". The disparity may have a value that is set in advance according to an arrangement design of the first camera 301L and the second camera 301R. The first image 310L and the second image 310R may be transformed into a single image (stereoscopic image) through calibration and composition that are performed by a processor of an electronic device.

Referring to FIG. 3B, as in FIG. 3A, a first camera 302L and a second camera 302R may receive light reflected from the subject 31 to create a first image 320L and a second image 320R, respectively. The first image 320L may have a specified disparity with the second image 320R.

According to an embodiment, the arrangement of a lens, an image sensor of the second camera 302R may minutely change due to external impact, a sharp variation in an external temperature, or age deterioration. As such, a translation of "Δy" may occur in the second image 320R obtained by the second camera 302R. If the first image 320L and the second image 320R in which the translation occurs are calibrated and composed by using a calibration parameter used in FIG. 3A, there may be difficulty in normal composition.

Only the translation of a y-axis direction may be considered in FIG. 3B. However, horizontal translation of the x axis, y-axis, and z-axis direction may occur due to external impact, a sharp variation in an external temperature, age deterioration, and rotation may happen about the x axis, y-axis, and z-axis. According to various embodiments of the present disclosure, in the case where physical deformation (e.g., translation or rotation) occurs in a first camera or a second camera due to an external factor(s), there may be provided a way to calibrate images obtained from the first and second cameras through software processing. Below, an image calibrating method and a configuration and an operation of an electronic device performing the same will be described.

Figure 4:
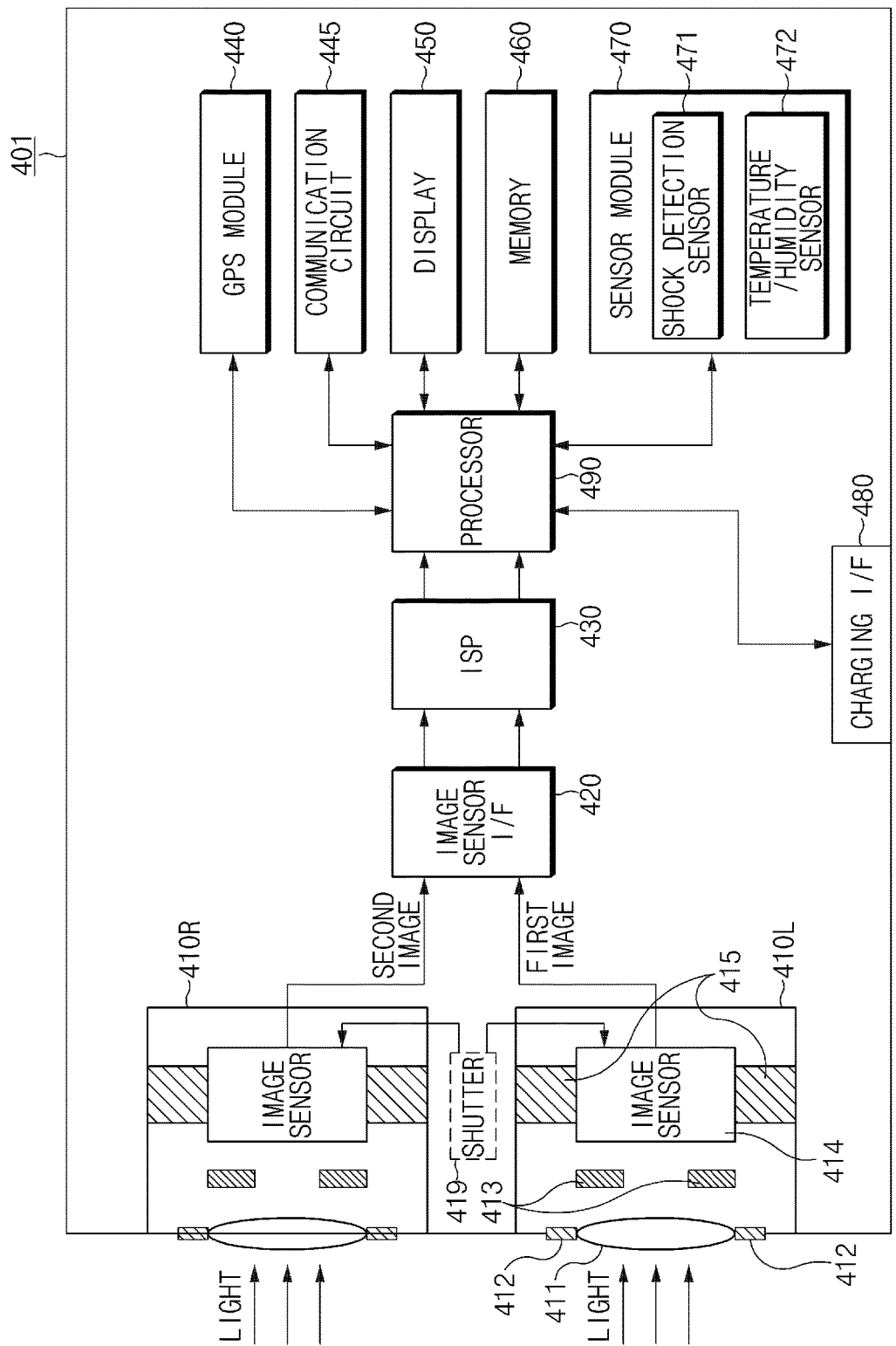
FIG. 4 illustrates a block diagram of the electronic device according to an embodiment of the present disclosure.

FIG. 4 illustrates a block diagram of an electronic device according to an embodiment of the present disclosure.

Referring to FIG. 4, an electronic device 401 according to an embodiment may include a first camera 410L, a second camera 410R, an image sensor interface (I/F) 420, an image signal processor (hereinafter referred to as an "ISP") 430, a GPS module 440, a communication circuit 445, a display 450, a memory 460, a sensor module 470, and a charging interface 480, and a processor 490. The electronic device 401 illustrated in FIG. 4 may correspond to the electronic device illustrated in FIG. 1 or 2, and a description that is given with reference to the corresponding elements of FIG. 1 or 2 may not be repeated herein. The electronic device 401 may be implemented without some elements or may be implemented to further include one or more elements not illustrated in FIG. 4.

The first camera 410L may include a lens 411, an optical image stabilization (OIS) driver module 412 and 415, an aperture 413, an image sensor 414, and a shutter 419. According to various embodiments, the first camera 410L may be implemented without some elements or may be implemented to further include one or more elements not illustrated in FIG. 4. The second camera 410R includes the same configuration as the first camera 410L, and a description thereof is thus replaced with a description of the first camera 410L.

The lens 411 may focus light incident on the first camera 410L from the outside. The focused light may reach the image sensor 414 through the aperture 413. That is, the lens 411 may allow light reflected by a subject or light produced from the subject to reach a pixel array of the image sensor 414.

The aperture 413 may adjust the amount of light (the intensity of radiation) reaching (or incident on) the image sensor 414. In general, the amount of light reaching the image sensor 414 may decrease as an aperture value becomes larger and may increase as the aperture value becomes smaller.

The image sensor 414 may include the pixel array in which a plurality of pixels are two-dimensionally arranged in a lattice shape. The pixel array may include millions or tens of millions of pixels, and one of a plurality of predetermined colors may be allocated to each of the pixels. For example, the plurality of predetermined colors may include "red, green, and blue (RGB)" or "red, green, blue, and white (RGBW)". The image sensor 414 may be implemented using charge-coupled device (CCD) or complementary metal-oxide-semiconductor (CMOS), for example.

According to an embodiment, the image sensor 414 may generate an electrical signal based on light received from the outside and may generate digital image data (e.g., Bayer image data) based on the electrical signal. The image sensor 414 of the first camera 410L may obtain first image data (also referred simply to as a "first image") of a subject. The image sensor 414 of the second camera 410R may obtain second image data (also referred simply to as a "second image") of the subject that has a disparity with the first image of the subject.

The shutter 419 may adjust a time when the image sensor 414 is exposed to light. If the shutter 419 operates slowly, the large amount of light may be incident on the image sensor 414; if the shutter 419 operates quickly, the small amount of light may be incident on the image sensor 414. A time when the shutter 419 operates may be adjusted based on a shutter speed. The shutter 419 may include a mechanical shutter or an electronic shutter of a way to control an image sensor.

The OIS driver module 412 and 415 may dynamically adjust an arrangement (or position) of the lens 411 or the image sensor 414. The OIS driver module 412 and 415 may finely adjust the arrangement of the lens 411 or the image sensor 414 in a direction that is opposite to a direction of movement of a hand gripping the electronic device 401. Accordingly, it may be possible to correct the blurring of an image due to the movement of the hand. According to various embodiments, the OIS driver module 412 and 415 may be referred to as a vibration reduction (VR) module, an image stabilizer (IS), an optical stabilizer (OS), an anti-shake (AS) module, a steady shot module, and the like, depending on a manufacturer of the electronic device 401.

The image sensor interface (I/F) 420 may mediate data exchange between the image sensor 414 and another element (e.g., the ISP 430). The image sensor interface (I/F) 420 may transfer image data generated in the image sensor 414 to the ISP 430.

The ISP 430 may include a plurality of image processing blocks (hereinafter referred to as "IP blocks"). The ISP 430 may correct a first image obtained from the first camera 410L and a second image obtained from the second camera 410R, through the plurality of IP blocks. The IP blocks may include various IP blocks such as an IP block for color interpolation, an IP block for lens shading correction, an IP block for auto white balance, an IP block for lateral chromatic aberration correction, an IP block for optical inverse correction, an IP block for noise reduction, an IP block for edge enhancement, an IP block for gamma correction, or an IP block for out of focusing. The plurality of IP blocks may be also referred to as an "image processing filter", an "image processing module", and the like. Also, according to various embodiments, the ISP 430 may be included in the processor 490. In this case, processing of the ISP 430 may be performed after calibration or composition by the processor 490.

The GPS module 440 may measure a position of the electronic device 401 through interaction with a GPS satellite. The GPS may be interchangeably used with "GNSS" and may be referred to as "Glonass", "Beidou", or "Galileo", for example, depending on a use region or bandwidth. According to various embodiments, the GPS module 440 may be included and implemented in the communication circuit 445.

The communication circuit 445 may transmit and receive, for example, signals to and from a base station (e.g., NodeB, e-NodeB, etc.) over a cellular communication network that is based on a protocol such as GSM, CDMA, or LTE. The communication circuit 445 may include a transceiver, a power amplifier (PAM), a frequency filter, a low noise amplifier (LAN), an antenna, etc.

The display 450 may visibly output various content (e.g., a text, an image, a video, an icon, a widget, a symbol, or the like) to a user. According to an embodiment, the display 450 may include a touch sensor in which the display 450 may receive a touch, gesture, proximity, or hovering input by using an electronic pen or part of a body of the user.

The memory 460 may include a volatile and/or nonvolatile memory. The memory 460 may store commands or data associated with at least one other element of the electronic device 401. The memory 460 may store instructions that, when executed, cause the processor 490 to perform various operations (e.g., refer to FIGS. 5 to 8) disclosed herein. After the instructions are implemented with software such as an application program, an OS, or firmware, the instructions may be stored in the memory 460 or may be embedded in hardware.

According to an embodiment, the memory 460 may store a first calibration parameter. The first calibration parameter may be stored in the memory 460 in a look-up table (LUT) format and may be used for calibration of images obtained from the first camera 410L and the second camera 410R.

The sensor module 470 may measure or sense a physical quantity obtained in elements mounted on the electronic device 401 or in a peripheral environment of the electronic device 401 and may convert the physical quantity into an electrical signal. The sensor module 470 may include a shock detection sensor 471 and a temperature/humidity sensor 472. Only the shock detection sensor 471 and the temperature/humidity sensor 472 are illustrated in FIG. 4. However, according to various embodiments, the sensor module 470 may further include at least one of the sensors 240A to 240M included in the sensor module 240 of FIG. 2.

The shock detection sensor 471 may detect physical shock. The shock detection sensor 471 may include a gyro sensor and/or an acceleration sensor. A signal (or data) associated with the physical shock detected by the shock detection sensor 471 may be reported to the processor 490.

The temperature/humidity sensor 472 may measure a peripheral temperature and/or humidity of the electronic device 401. The temperature and/or humidity detected in the temperature/humidity sensor 472 may be reported to the processor 490.

To supply power to the electronic device 401, the charging interface 480 may be connected by wire or wirelessly connected with external power source. The charging interface 480 may include a PMIC, a charger IC, etc. and may be electrically connected to. The charging interface 480 may include a wired charging interface such as a USB interface or a wireless charging interface defined in wireless power consortium (WPC), power matters alliance (PMA), alliance for wireless power (AW4P), etc.

The processor 490 may be electrically connected with the elements 410 to 480 included in the electronic device 401 to execute operations or data processing associated with control and/or communication of the elements 410 to 480 included in the electronic device 401.

According to an embodiment, in response to an operation of the shutter 419, the processor 490 may obtain a first image from the first camera 410L and may obtain a second image from the second camera 410R. The processor 490 may calibrate at least one of the first image and the second image by using the first calibration parameter stored in the memory 460 (so-called static calibration). The processor 490 may compose the first image and the second image and may create a single composite image as the composition result.

According to an embodiment, the first calibration parameter may be set, upon manufacturing the electronic device 401, such that translation and rotation between images does not occur, depending on the mounting arrangement of the lens 411 and the image sensor 414 for each of the cameras 410L and 410R.

According to an embodiment, if a specified event occurs, the processor 490 may collect all or part of images obtained from the first camera 410L and the second camera 410R after the specified event occurs and may store the collected image(s) in the memory 460.

The specified event may include various events such as a change of the mounting arrangement of the lens 411 and the image sensor 414 of each of the first camera 410L and the second camera 410R due to an external factor. For example, the specified event may include the case where the shock detection sensor 471 detects shock of a specified value or more, the case where the temperature/humidity sensor 472 detects a temperature change being out of a specified range, the case where the GPS module 440 senses a location change of the electronic device 401 corresponding to movement between countries, and the case where the communication circuit 445 senses movement between countries based on a signal received from a base station.

The specified event may include the case where a difference between distances to a subject detected in two or more techniques is not less than a specified value. The processor 490 may detect a first distance (a distance from the electronic device 401 to a subject) of a subject included in a first image and a second image based on a difference between focal distances, that is, by using an auto focus (AF) function. Also, the processor 490 may detect a second distance (a distance from the electronic device 401 to the subject) of the subject by using a disparity between the first image and the second image.

If a difference between the first distance and the second distance is not less than a specified value, the processor 490 may determine that a specified event occurs.

If events of the above-described types occur, the processor 490 may store information about the events in the memory 460. The information about the events may include information that is associated with impulse detected in the shock detection sensor 471, a variation in a temperature or humidity detected in the temperature/humidity sensor 472, movement between countries sensed by using the GPS module 440 or the communication circuit 445. The information about the events stored in the memory 460 may be used to repair the electronic device 401 by an expert. According to an embodiment, images that are obtained after the specified event occurs may include raw data of images obtained from the first camera 410L and the second camera 410R or may include features included in the images obtained from the first camera 410L and the second camera 410R. The features may include a feature point according to a scale invariant feature transform (SIFT) algorithm or a speeded up robust feature (SURF). The feature points according to the SIFT algorithm and the SURF are, but are not limited thereto, examples of features capable of being extracted from an image. The features may include features (e.g., a histogram of oriented gradient (HOG) descriptor) capable of being extracted by other technologies.

According to an embodiment, the processor 490 may selectively collect images satisfying a specified criterion from among images obtained after the specified event occurs. For example, the processor 490 may write a specified indication in additional information (e.g., exchangeable image file format (EXIF) data) of the selectively collected images or may separately store identification information of the selectively collected images in the memory 460.

The processor 490 may collect images, the sensitivity of which belongs to a specified range. The sensitivity may be expressed by an ISO (international organization for standardization) 12232:1998 value, an ISO 12232:2006 value, or a combination thereof, when images are obtained.

The processor 490 may collect images, the brightness of which belongs to a specified range. The brightness may be expressed with an aperture value and/or an exposure time (shutter speed) when images are obtained.

The processor 490 may collect images of which the number of features (e.g., SIFT and SURF) extracted therefrom exceeds a threshold. If the number of the features increases or if the features are uniformly distributed in an image, the calibration may be more exactly made by the processor 490.

The processor 490 may collect images in which image composition fails. The case where the image composition fails may mean that it is impossible to perform image composition appropriately by using the first calibration parameter stored in the memory 460.

In the case where no image exists which satisfies the above-described reference from among images obtained after the specified event occurs, the processor 490 may provide the user with a guide message (e.g., providing the user with sample images) such that the user can take the image needed for calculating a second calibration parameter.

According to an embodiment, if a specified condition is satisfied, the processor 490 may compute the second calibration parameter based on images obtained from the first camera 410L and the second camera 410R after the specified event occurs (so-called dynamic calibration parameter calculation). By comparing a first image obtained from the first camera 410L and a second image obtained from the second camera 410R after the specified event occurs, the processor 490 may detect translation and rotation between the first and second images and may compute the second calibration parameter by using the detection result.

The processor 490 may compute the second calibration parameter based on images in which a specified indication is written in additional information (e.g., EXIF data) of the image. The processor 490 may compute the second calibration parameter based on images that identification information stored in the memory 460 indicates.

The specified condition may include the case where the electronic device 401 is supplied with power from the outside through the charging interface 480. The reason is that relatively many computing resources and power necessary for the computing resources are consumed to compute the second calibration parameter based on images obtained after a specified event occurs. According to various embodiments, the specified condition may be satisfied based on a user input through a user interface even though the electronic device 401 is not supplied with power through the charging interface 480.

The processor 490 may update the first calibration parameter stored in the memory 460 with the computed second calibration parameter. Afterwards, the processor 490 may calibrate images obtained after a specified event occurs by using the computed second calibration parameter and/or images newly obtained after the second calibration parameter is computed and may compose the calibrated images. That is, the processor 490 may compose a first image and a second image that are obtained every shutter operation after a specified event occurs and are calibrated by using the second calibration parameter. If the composition fails, the processor 490 may provide the user with a specified notification. The specified notification may include a message proposing to make a request to an expert for repair.

In this disclosure, at least some of operations described as operations of an "electronic device" should be understood as being operations of the processor 490.

Figure 5:
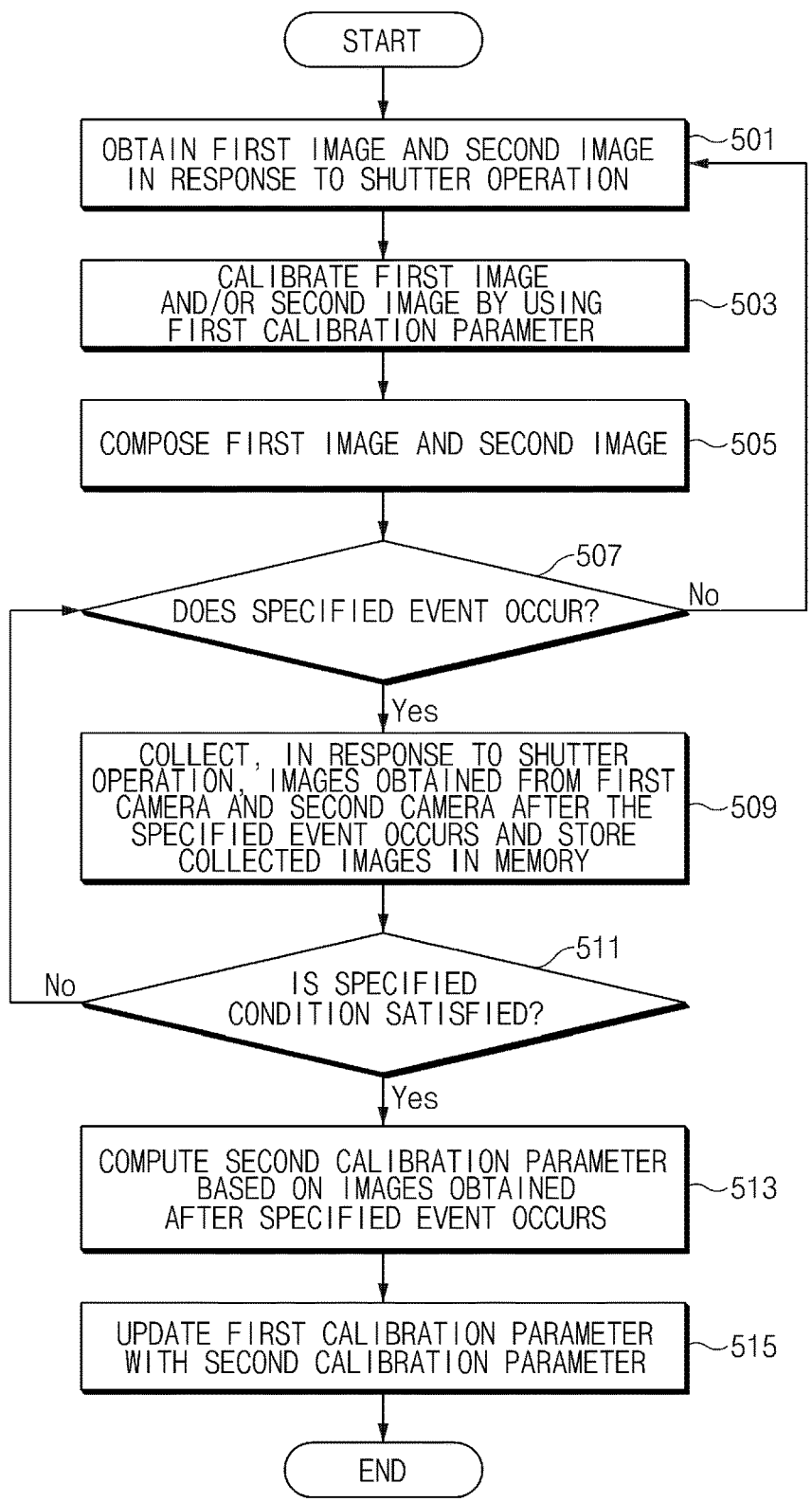
FIG. 5 is a flowchart illustrating a calibration method according to an embodiment of the present disclosure.

FIG. 5 is a flowchart illustrating a calibration method according to an embodiment.

Referring to FIG. 5, the calibration method according to an embodiment may include operation 501 to operation 515. Operation 501 to operation 515 may be performed by, the electronic device 401 illustrated in FIG. 4. Operation 501 to operation 515 may be respectively implemented with, instructions that are capable of being performed (or executed) by the processor 490 of the electronic device 401. The instructions may be stored in, a computer-readable recording medium or the memory 460 of the electronic device 401 illustrated in FIG. 4. Hereinafter, the reference numerals of FIG. 4 may be used to describe operation 501 to operation 515, and a description that is the same as described with reference to FIG. 4 will not be repeated here.

In operation 501, in response to an operation of the shutter 419, the processor 490 of the electronic device 401 may obtain a first image from the first camera 410L and may obtain a second image from the second camera 410R.

In operation 503, the processor 490 may calibrate the first image and/or the second image by using the first calibration parameter (static calibration).

In operation 505, the processor 490 may compose the first image and the second image. In FIG. 5, operation 505 is performed after the operation 503, however, embodiments of the present disclosure may not be limited thereto. According to various embodiments, the composition of operation 505 may be performed prior to operation 503.

In operation 507, the processor 490 may determine whether a specified event occurs. If it is determined that the specified event occurs, the procedure may proceed to operation 509; otherwise, the procedure may return to operation 501. For example, the specified event may include various events such as a change of the mounting arrangement of the lens 411 and the image sensor 414 of each of the first camera 410L and the second camera 410R.

The specified event may include the case where the shock detection sensor 471 detects shock of a specified value or more, the case where the temperature/humidity sensor 472 detects a temperature change being out of a specified range, the case where the GPS module 440 senses a location change of the electronic device 401 corresponding to movement between countries, and the case where the communication circuit 445 senses movement between countries based on a signal received from a base station. The specified event may include the case where a difference between distances of a subject detected in different methods is not less than a specified value (to be described in FIG. 7).

If the specified event occurs, in operation 509, the processor 490 may collect all or part of images obtained from the first camera 410L and the second camera 410R after the specified event occurs and may store the collected image(s) in the memory 460.

The images that are obtained after the specified event occurs may include raw data of images obtained from the first camera 410L and the second camera 410R, or may include features included in the images obtained from the first camera 410L and the second camera 410R. The features may include a feature point according to the SIFT algorithm or the SURF.

In operation 511, the processor 490 may determine whether a specified condition is satisfied. If it is determined that the specified condition is satisfied, the procedure may proceed to operation 513; otherwise, the procedure may return to operation 507. The specified condition may include the case where the electronic device 401 is supplied with power from the outside through the charging interface 480. The specified condition may be satisfied based on a user input through a UI even though the electronic device 401 is not supplied with power through the charging interface 480.

If the specified condition is satisfied, in operation 513, the processor 490 may compute the second calibration parameter based on images obtained from the first camera 410L and the second camera 410R after the specified event occurs (dynamic calibration parameter calculation).

In operation 515, the processor 490 may update the first calibration parameter stored in the memory 460 with the second calibration parameter computed in operation 513.

Figure 6:
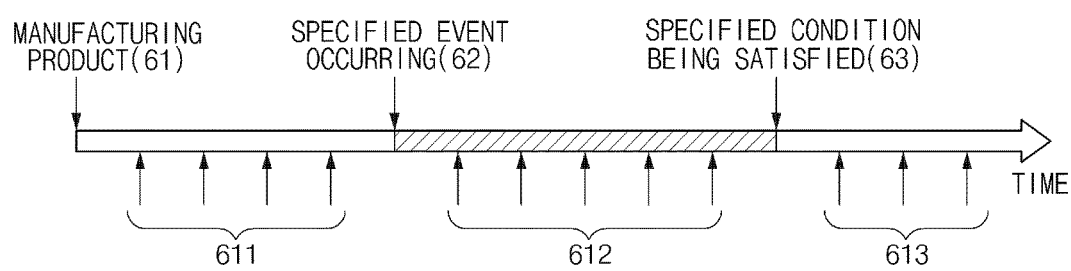
FIG. 6 is a view for describing a point in time when the calibration method according to an embodiment of the present disclosure is performed.

FIG. 6 is a view for describing a point in time when a calibration method according to an embodiment is performed.

A time line for describing a point in time when a calibration method according to an embodiment is performed is illustrated in FIG. 6. The time line will be described by using reference numerals of FIG. 4.

At the time 61 of manufacturing a product, i.e., the electronic device 401, a first calibration parameter may be set in the manufacturing process and may then be stored in the memory 460 of the electronic device 401. As such, the processor 490 of the electronic device 401 may calibrate a first image and a second image obtained from the first camera 410L and the second camera 410R depending on a plurality of shutter operations 611 by using the first calibration parameter. The first image and the second image thus calibrated may be composed to a single image, and the single image may be stored in the memory 460 or may be output to the display 450.

If a specified event occurs while the electronic device 401 is used (at time 62), from the point in time 62 when the specified event occurs to a point in time 63 when a specified condition is satisfied, the processor 490 may collect a first image and a second image obtained from the first camera 410L and the second camera 410R in response to shutter operations 612 and may store the collected images in the memory 460.

The specified event may include the case where the shock detection sensor 471 detects shock of a specified value or more, the case where the temperature/humidity sensor 472 detects that a temperature is out of a specified range, the case where the GPS module 440 senses a location change of the electronic device 401 corresponding to movement between countries, and the case where the communication circuit 445 senses movement between countries based on a signal received from a base station. The specified event may include the case where a difference between distances of a subject detected in different methods is not less than a specified value.

According to an embodiment, the processor 490 may collect all of images obtained from the point in time 62 when the specified event occurs to a point in time 63 when a specified condition is satisfied or may selectively collect the obtained images depending on a specified reference. The processor 490 may collect an image having the sensitivity within a specified range, an image having the brightness within a specified range, an image having the number of features (e.g., SIFT and SURF) extracted therefrom exceeds a threshold, or an image in which image composition fails.

If the specified condition is satisfied (at time 63), the processor 490 may compute a second calibration parameter based on images obtained in response to the shutter operations 612 from the point in time 62 when the specified event occurs to the point in time 63 when a specified condition is satisfied. The specified condition may be satisfied when the electronic device 401 is supplied with power from the outside through the charging interface 480 or by a user manipulation.

If the second calibration parameter is computed, the processor 490 may update the first calibration parameter in advance stored in the memory 460 with the computed second calibration parameter. Based on the second calibration parameter, the processor 490 may calibrate the images obtained in response to the shutter operations 612 from the point in time 62 when the specified event occurs to the point in time 63 when a specified condition is satisfied and/or images obtained in response to shutter operations 613 after a point in time 63 when the specified condition is satisfied.

Figure 7:
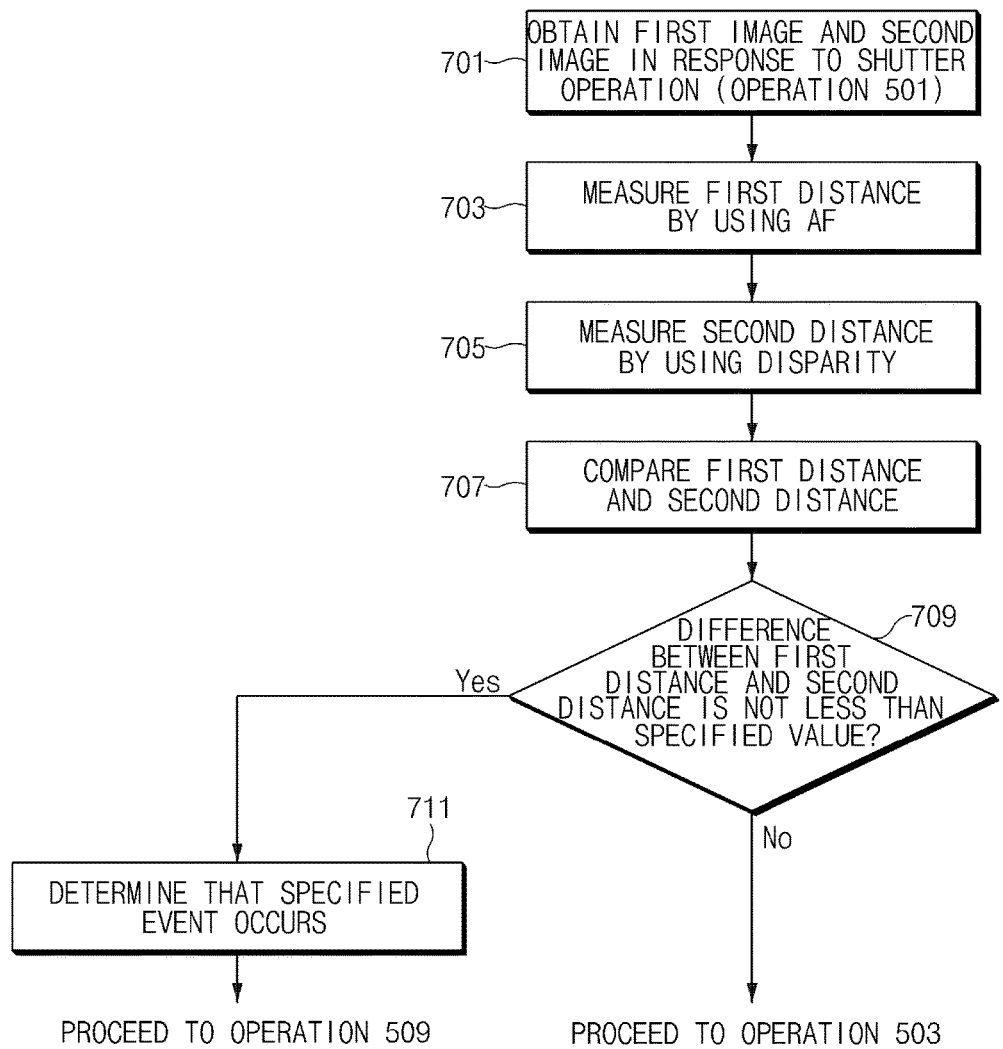
FIG. 7 is a flowchart for describing a specified event according to an embodiment of the present disclosure.

FIG. 7 is a flowchart for describing a specified event according to an embodiment.

As described above, according to various embodiments, the specified event may include the case where the shock detection sensor 471 detects a shock of a specified value or more, the case where the temperature/humidity sensor 472 detects that a temperature is out of a specified range, the case where the GPS module 440 senses a position change of the electronic device 401 corresponding to movement between countries, or the case where the communication circuit 445 senses movement between countries based on a signal received from a base station.

In addition, referring to operation 701 to operation 711 illustrated in FIG. 7, the specified event may include the case where a difference between distances to a subject detected in two or more techniques is not less than a specified value. Operation 701 to operation 711 may be executed by, for example, the electronic device 401 illustrated in FIG. 4. Operation 701 to operation 711 may be respectively implemented with, for example, instructions that are capable of being performed (or executed) by the processor 490 of the electronic device 401. The instructions may be stored in, for example, a computer-readable recording medium or the memory 460 of the electronic device 401 illustrated in FIG. 4. Below, the reference numerals of FIG. 4 may be used to describe operation 701 to operation 711, and a description that is the same as described with reference to FIGS. 4 to 6 will not be repeated here.

In operation 701, in response to an operation of the shutter 419, the processor 490 of the electronic device 401 may obtain a first image from the first camera 410L and may obtain a second image from the second camera 410R. Operation 701 may correspond to operation 501 illustrated in FIG. 5.

In operation 703, the processor 490 may measure a first distance from the electronic device 401 to a subject by using an auto focus (AF) function. For example, the processor 490 may measure the first distance of the subject included in the first image and the second image based on a difference between focal distances.

In operation 705, the processor 490 may measure a second distance (a distance from the electronic device 401 to the subject) of the subject based on depth information of the subject using a binocular disparity.

In operation 707, the processor 490 may compute a difference between the first distance measured in operation 703 and the second distance measured in operation 705 by comparing the first distance and the second distance.

In operation 709, the processor 490 may determine whether the difference computed in operation 707 is not less than (or exceeds) a specified value. If it is determined that the difference is not less than (or exceeds) the specified value, the procedure may proceed to operation 711; otherwise, the procedure may return to operation 503.

In operation 711, since the difference between the first distance and the second distance computed in operation 707 is not less than (or exceeds) the specified value, the processor 490 may determine that a specified event occurs and may proceed to operation 509 illustrated in FIG. 5.

Figure 8:
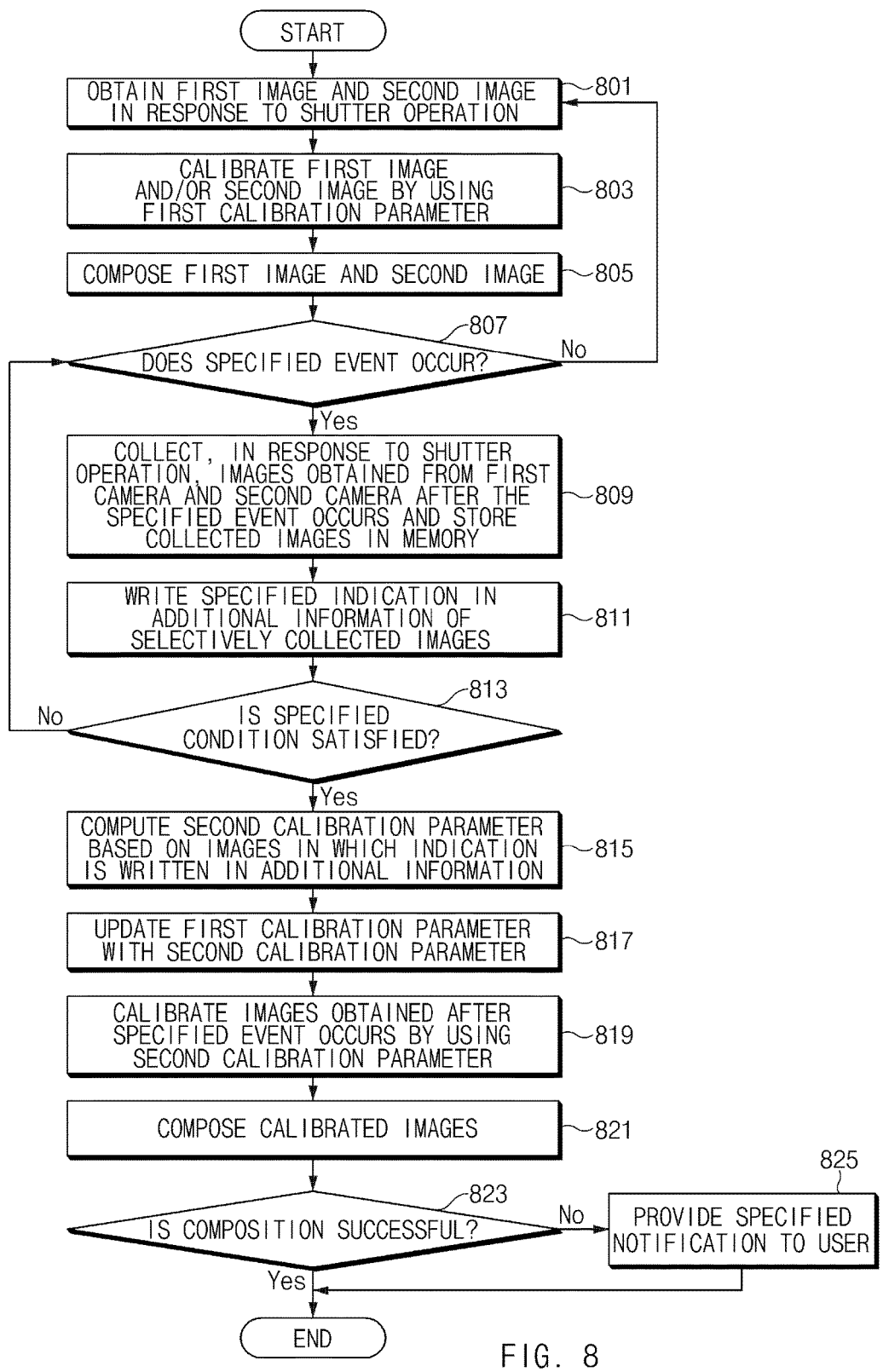
FIG. 8 is a flowchart illustrating the calibration method according to another embodiment of the present disclosure.

FIG. 8 is a flowchart illustrating a calibration method according to another embodiment.

Referring to FIG. 8, the calibration method according to an embodiment may include operation 801 to operation 825. Operation 801 to operation 825 may be performed by, for example, the electronic device 401 illustrated in FIG. 4. For example, each of operation 801 to operation 825 may be implemented with instructions to be performed (or executed) by the processor 490 of the electronic device 401. The instructions may be stored in a computer-readable recording medium or the memory 460 of the electronic device 401 illustrated in FIG. 4. Below, the reference numerals of FIG. 4 may be used to describe operation 801 to operation 825, and a description that is the same as described with reference to FIGS. 4 and 5 will not be repeated here.

In operation 801, in response to an operation of the shutter 419, the processor 490 of the electronic device 401 may obtain a first image from the first camera 410L and may obtain a second image from the second camera 410R.

In operation 803, the processor 490 may calibrate the first image and/or the second image by using the first calibration parameter (static calibration).

In operation 805, the processor 490 may compose the first image and the second image. In FIG. 8, operation 805 is performed operation 803, however, embodiments of the present disclosure may not be limited thereto. According to various embodiments, operation 805 may be performed prior to operation 803.

In operation 807, the processor 490 may determine whether a specified event occurs. If it is determined that the specified event occurs, the procedure may proceed to operation 809; otherwise, the procedure may return to operation 801. The specified event may include various events such as a change of the mounting arrangement of the lens 411 and the image sensor 414 of each of the first camera 410L and the second camera 410R.

The specified event may include the case where the shock detection sensor 471 detects shock of a specified value or more, the case where the temperature/humidity sensor 472 detects that a temperature is out of a specified range, the case where the GPS module 440 senses a location change of the electronic device 401 corresponding to movement between countries, and the case where the communication circuit 445 senses movement between countries based on a signal received from a base station. The specified event may include the case where a difference between distances of a subject detected in different methods is not less than a specified value.

According to various embodiments, if events of the above-described types occur, the processor 490 may store information about the events in the memory 460. The information about the events may include information that is associated with impulse detected in the shock detection sensor 471, a variation in a temperature or humidity detected in the temperature/humidity sensor 472, movement between countries sensed by using the GPS module or the communication circuit 445. The information about the events stored in the memory 460 may be used to repair the electronic device 401 by an expert.

If the specified event occurs, in operation 809, the processor 490 may selectively collect a image satisfying a specified condition from among images obtained from the first camera 410L and the second camera 410R after the specified event occurs.

The processor 490 may collect an image, the sensitivity of which is within a specified range, an image, the brightness of which is within a specified range, an image of which the number of features (e.g., SIFT and SURF) extracted therefrom exceeds a threshold, or an image in which image composition fails. In the case where no image exists which satisfies the above-described reference from among the images obtained after the specified event occurs, the processor 490 may provide the user with a guide message (e.g., providing the user with sample images) so the user can take an image needed for calculating a second calibration parameter.

In operation 811, the processor 490 may write additional information (e.g., EXIF data) to the images selectively collected in operation 809. According to various embodiments, the processor 490 may separately store identification information of the selectively collected images in the memory 460.

In operation 813, the processor 490 may determine whether a specified condition is satisfied. If it is determined that the specified condition is satisfied, the procedure may proceed to operation 815; otherwise, the procedure may return to operation 807. The specified condition may include the case where the electronic device 401 is supplied with power from the outside through the charging interface 480. The specified condition may be satisfied based on a user input through a UI even though the electronic device 401 is not supplied with power through the charging interface 480.

If the specified condition is satisfied, in operation 815, the processor 490 may compute the second calibration parameter based on images obtained from the first camera 410L and the second camera 410R after the specified event occurs.

According to an embodiment, the processor 490 may compute the second calibration parameter based on images in which additional information (e.g., EXIF data) is written to the image. The processor 490 may compute the second calibration parameter based on images that identification information stored in the memory 460 indicates.

In operation 817, the processor 490 may update the first calibration parameter stored in the memory 460 with the second calibration parameter computed in operation 815.

In operation 819, the processor 490 may calibrate the images obtained after the specified event occurs by using the second calibration parameter updated in operation 817. Alternatively, the processor 490 may calibrate images newly obtained after the second calibration parameter is computed, by using the second calibration parameter.

In operation 821, the processor 490 may compose the images calibrated in operation 819. The processor 490 may compose the first image and the second image that are calibrated after being obtained depending on shutter operations.

In operation 823, the processor 490 may determine whether composition of the first image and the second image performed in operation 821 is successful. If the composition is successful, the processor 490 may end the calibration method according to an embodiment and may store the composite image in the memory 460 or may output the composite image to the display 450. In contrast, if the composition fails, the procedure may proceed to operation 825.

If the composition of operation 821 fails, in operation 825, the processor 490 may provide a specified notification to the user. For example, the specified notification may include outputting to the display 450 a message proposing to make a request to an expert for repair.

According to various embodiments of the present disclosure, in the case where translation and/or rotation occurs between a first image and a second image due to external shock, a sharp change in an external temperature, or aged deterioration, it may be possible to compute the most appropriate calibration parameter and to update a previous calibration parameter with the most appropriate calibration parameter thus computed. Accordingly, it may be possible to compose images of a stereo camera efficiently and to reduce the number of times that an electronic device is repaired by an expert.

As described above, an electronic device according to an embodiment may include a first camera that obtains a first image, a second camera that obtains a second image having a disparity with the first image, a memory that stores a first calibration parameter, and a processor that calibrates at least one of the first image and the second image by using the first calibration parameter and composes the first image and the second image. The processor may be configured to collect, if a specified event occurs, images obtained from the first camera and the second camera after the specified event occurs and store the collected images in the memory, to compute a second calibration parameter based on the images obtained after the specified event occurs, if a specified condition is satisfied, and to update the first calibration parameter with the second calibration parameter.

If the specified condition is satisfied, the processor may be configured to calibrate the images obtained after the specified event occurs by using the computed second calibration parameter to compose the images.

The processor may be configured to provide a specified notification to a user if the composition fails.

The images obtained after the specified event occurs may include raw data of the images obtained from the first camera and the second camera.

The images obtained after the specified event occurs may include features included in the images obtained from the first camera and the second camera.

The features may include a feature point according to a scale invariant feature transform (SIFT) algorithm or a speeded up robust feature (SURF).

The processor may be configured to selectively collect images satisfying a specified criterion from among the images obtained after the specified event occurs.

The processor may be configured to collect images where the sensitivity of each is within a specified range.

The processor may be configured to collect images where the brightness of each is within a specified range.

The processor may be configured to collect images when the number of features extracted from the images exceeds a threshold.

The processor may be configured to collect images in which image composition fails.

The processor may be configured to write a specified indication of additional information from selectively collected images and to compute the second calibration parameter based on the images in which the specified indication is written, if the specified condition is satisfied.

The processor may be configured to store identification information of the selectively collected images and to compute the second calibration parameter based on the images that the identification information indicates, if the specified condition is satisfied.

The electronic device may further include a shock detection sensor configured to sense physical shock from the outside. The specified event may include detecting at the shock detection sensor a shock of a specified value or more.

The electronic device may further include a temperature sensor configured to measure a peripheral temperature of the electronic device. The specified event may include detecting a temperature change that is out of a specified range.

The electronic device may further include a GPS module configured to measure a position of the electronic device. The specified event may include a position change of the electronic device corresponding to movement between countries.

The electronic device may further include a communication circuit configured to transmit and receive signals to and from a base station. The specified event may include detecting movement between countries based on a signal received from the base station.

The processor may be configured to detect a first distance to a subject included in to the first image and the second image based on a difference between focal distances, to detect a second distance to the subject by using a disparity between the first image and the second image, and to determine that the specified event occurs, if a difference between the first distance and the second distance is not less than a specified value.

The processor may be configured to store information about the specified event in the memory if the specified event occurs.

The specified event may include an event that the electronic device is supplied with power from the outside.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be implemented by instructions stored in computer-readable storage media in the form of a program module. The instruction, when executed by a processor (e.g., the processor 120), may cause one or more processors to perform a function corresponding to the instruction. The computer-readable storage media may be the memory 130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a assembly code such as things generated by a compiler but also a high-level language code executable on a computer using an interpreter. The above hardware unit may be configured to operate via one or more software modules for performing an operation according to various embodiments, and vice versa.

A module or a program module according to various embodiments may include of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of the present disclosure, in the case distortion of a lens or an image sensor occurs due to external shock, a sharp change in an external temperature, or aged deterioration, it may be possible to compute the most appropriate calibration parameter and to update a previous calibration parameter with the most appropriate calibration parameter thus computed. Accordingly, it may be possible to compose images of a stereo camera efficiently and to reduce the number of times that an electronic device is repaired by an expert. In Addition, a variety of effects directly or indirectly understood through this disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a first camera configured to obtain a first image;
    a second camera configured to obtain a second image having a disparity with the first image;
    a memory configured to store a first calibration parameter; and
    a processor configured to calibrate at least one of the first image and the second image by using the first calibration parameter and to compose the first image and the second image,
    wherein the processor is further configured to:
        if a specified event occurs, collect images obtained from the first camera and the second camera after the specified event occurs and store the collected images in the memory,
        if a specified condition is satisfied, compute a second calibration parameter based on the images obtained after the specified event occurs, and
        update the first calibration parameter with the second calibration parameter.

2. The electronic device of claim 1, wherein the processor is further configured to:
    if the specified condition is satisfied, calibrate the images obtained after the specified event occurs by using the computed second calibration parameter, and compose the images.

3. The electronic device of claim 2, wherein the processor is further configured to:
    if the composition fails, provide a notification to a user.

4. The electronic device of claim 1, wherein the images obtained after the specified event occurs include raw data of the images obtained from the first camera and the second camera.

5. The electronic device of claim 1, wherein the images obtained after the specified event occurs include features included in the images obtained from the first camera and the second camera.

6. The electronic device of claim 5, wherein the features include a feature point according to one of a scale invariant feature transform (SIFT) algorithm and a speeded up robust feature (SURF).

7. The electronic device of claim 1, wherein the processor is further configured to:
    selectively collect images satisfying a specified criterion from among the images obtained after the specified event occurs.

8. The electronic device of claim 7, wherein the processor is further configured to:
    collect images in which at least one of the sensitivity of each image is within a specified range and the brightness of each image is within a specified range.

9. The electronic device of claim 7, wherein the processor is further configured to:
    collect images in which the number of features extracted therefrom exceeds a threshold.

10. The electronic device of claim 7, wherein the processor is further configured to:
    collect images in which image composition fails.

11. The electronic device of claim 7, wherein the processor is further configured to:
    write a specified indication in additional information to the selectively collected images; and
    if the specified condition is satisfied, compute the second calibration parameter based on the images in which the specified indication is written.

12. The electronic device of claim 7, wherein the processor is further configured to:
    store identification information of the selectively collected images; and
    if the specified condition is satisfied, compute the second calibration parameter based on the images that the identification information indicates.

13. The electronic device of claim 1, further comprising:
    a shock detection sensor configured to sense physical shock from the outside,
    wherein the specified event includes detecting, at the shock detection sensor, a shock of a specified value or more.

14. The electronic device of claim 1, further comprising:
    a temperature sensor configured to measure a peripheral temperature of the electronic device,
    wherein the specified event includes detecting a temperature change being out of a specified range.

15. The electronic device of claim 1, further comprising:
    a GPS module configured to measure a position of the electronic device,
    wherein the specified event includes a position change of the electronic device.

16. The electronic device of claim 1, further comprising:
    a communication circuit configured to transmit and receive signals to and from a base station,
    wherein the specified event includes detecting movement based on a signal received from the base station.

17. The electronic device of claim 1, wherein the processor is further configured to:
    detect a first distance to a subject included in the first image and the second image based on a difference between focal distances;
    detect a second distance of the subject by using the disparity between the first image and the second image; and
    if a difference between the first distance and the second distance is not less than a specified value, determine that the specified event occurs.

18. The electronic device of claim 1, wherein the processor is further configured to:
    if the specified event occurs, store information about the specified event in the memory.

19. The electronic device of claim 1, wherein the specified event includes an event that the electronic device is supplied with power from the outside.

20. A method for calibrating a stereo camera, comprising:
    obtaining a first image;
    obtaining a second image having a disparity with the first image;

calibrating at least one of the first images and the second image by using a first calibration parameter;
composing the first image and the second image;
collecting, if a specified event occurs, images obtained after the specified event occurs;
storing the collected images in a memory;
computing a second calibration parameter based on the images obtained after the specified event occurs; and
if a specified condition is satisfied, updating the first calibration parameter with the second calibration parameter.

* * * * *